US005298938A

United States Patent [19]

Tanabe

[11] Patent Number: 5,298,938

[45] Date of Patent: Mar. 29, 1994

[54] SCANNING APPARATUS AIR CONDITIONER

[75] Inventor: Kenichi Tanabe, Osaka, Japan

[73] Assignee: Mita Industrial Co., Ltd., Osaka, Japan

[21] Appl. No.: 3,326

[22] Filed: Jan. 12, 1993

[30] Foreign Application Priority Data

Jan. 20, 1992 [JP] Japan .................................. 4-007435

[51] Int. Cl.[5] ........................ G03B 27/52; G03B 27/62

[52] U.S. Cl. .......................................... 355/30; 355/75

[58] Field of Search ............................ 355/203, 30, 75

[56] References Cited

U.S. PATENT DOCUMENTS

| | | | |
|---|---|---|---|
| 4,456,372 | 6/1984 | Yamauchi | 355/75 |
| 4,551,013 | 11/1985 | Yoshioka et al. | 355/55 |
| 4,632,539 | 12/1986 | Temple | 355/30 |
| 4,692,019 | 9/1987 | Morimoto et al. | 355/75 X |
| 4,751,551 | 6/1988 | Beiter et al. | 355/30 |
| 4,814,833 | 3/1989 | Matsushita et al. | 355/75 |
| 4,987,442 | 1/1991 | Ueomori | 355/50 |
| 5,016,049 | 5/1991 | Onishi et al. | 355/203 |
| 5,073,796 | 12/1991 | Suzuki et al. | 355/304 |
| 5,119,130 | 6/1992 | Tsudaka et al. | 355/203 |
| 5,172,159 | 12/1992 | Nakagama et al. | 355/30 |

OTHER PUBLICATIONS

Patent Abstracts of Japan, vol. 13, No. 382 (P-923) (3730) dated Aug. 24, 1989 for Japanese Laid-Open Application No. JP-A-01 133 076 by Aisaka, entitled "Original Size Detector With Vibration-Damping Function", published May 25, 1989.

Patent Abstract of Japan, vol. 13, No. 306 (P-897) (3654) Jul. 13, 1989 for Japanese Laid-Open Application No. JP-A-01 079 769 by Tatsuya Shiratori, entitled "Image Forming Device", published Mar. 24, 1989.

*Primary Examiner*—Richard A. Wintercorn

*Attorney, Agent, or Firm*—Beveridge, DeGrandi, Weilacher & Young

[57] ABSTRACT

In an apparatus for scanning an original image-bearing sheet, including a transparent sheet-retaining plate, below which are a sheet-scanning optical system, a size-detection arm having sensors for measuring an original sheet retained on the plate, and a blower for introducing cooling air into the space under the plate, airstream guides which divert and redirect the cooling air flowing from the blower are provided on the size-detection arm. The airstream guides properly distribute the cooling air beneath the plate, whereby the plate is efficiently cooled.

18 Claims, 3 Drawing Sheets

SCANNING APPARATUS AIR CONDITIONER

BACKGROUND OF THE INVENTION

The present invention relates to a scanning apparatus; and more specifically, it relates to an apparatus for scanning sheets containing a source original image retained on a contact plate in applications such as in image forming apparatus.

A conventional scanning device installed in an image forming apparatus such as a copying machine includes a transparent plate for retaining original sheets; an optical system disposed below the plate for scanning the original material; a size-detection arm having original sheet-size detection sensors; and a fan for introducing cooling air into the space under the plate.

Because the scanning apparatus plate becomes heated by flare of the optical system, cooling air is supplied beneath it by the fan in order to reduce the plate temperature.

Under applications requiring high-speed copying, however, the optical system successively scans original material with such frequency that the plate heats considerably. Accordingly, a fan having a greater blowing capacity should thus be required in order to increase effective cooling. Disadvantageously, greater space would be occupied by employing a therefore larger fan, consequently increasing overall size of the scanning apparatus.

SUMMARY OF THE INVENTION

An object of the present invention is to efficiently cool an original-material retaining plate.

An apparatus for scanning sheets of original material according to the present invention comprises a transparent plate for retaining original material; an optical system disposed below the plate for scanning the original material retained thereon; a size-detection arm, also located beneath the plate, having original sheet-size detection sensors; a blower for introducing cooling air into the space below the plate; and airstream guides, provided on the size-detection arm, for deflecting and redirecting the cooling air issuing from the blower.

In operation of the apparatus, the size of an original sheet positioned on the plate is detected by the sensors of the size-detection arm, and the original is scanned by the optical system.

The plate, having undergone heating due to the optical system flare, is cooled by air from the blower, wherein the air-stream guides provided on the arm divert and redirect the air flowing from the blower. Consequently, air flow is properly distributed beneath the plate by the airstream guides, whereby the plate is efficiently cooled.

These and other objects and advantages of the present invention will be more fully apparent from the following detailed description.

DESCRIPTION OF THE PREFERRED EMBODIMENT

Figure 1:
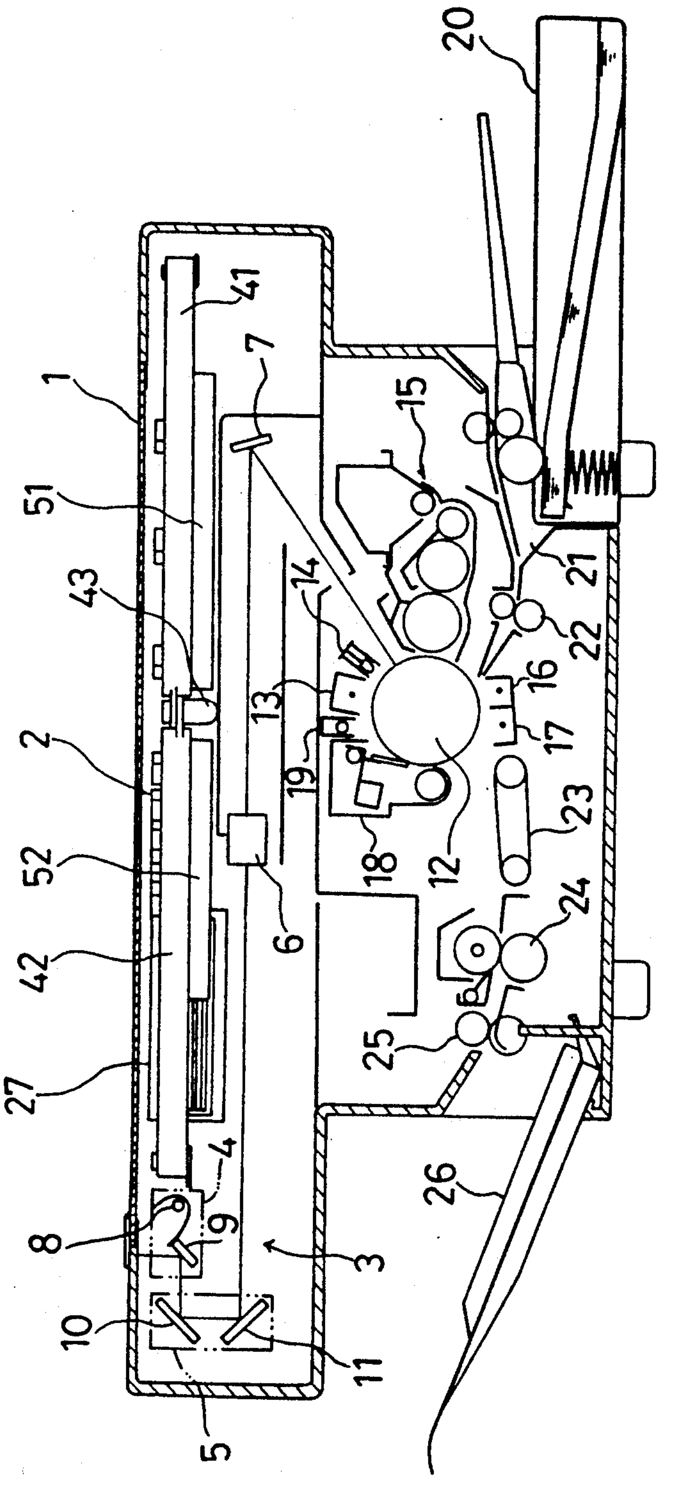
FIG. 1 is an elevational view with sections magnified showing a copying machine including a scanning apparatus according to the present invention.

Referring to FIG. 1, a copying machine is shown therein to include a contact plate 1 in the upper surface for retaining original sheets. The contact plate 1 is transparent, and made of glass, or acrylic resin, etc. Disposed under the contact plate 1 is an original detecting device 2 which comprises an arm composed of a pair of bars 41 and 42, a pair of airstream guides 51 and 52 and a connecting pin 43. Also disposed beneath the contact plate 1 is an optical system 3 which includes a first movable frame 4, a second movable frame 5, a lens unit 6 and a reflection mirror 7. The first movable frame 4 retains a light source 8 and a first reflection mirror 9, and the second movable frame 5 retains second and third reflection mirrors 10 and 11. A fan blower 27 is shown disposed behind the original detecting device 2 and the optical system 3 in the figure.

A photoconductive drum 12 on which a latent image is formed by the optical system 3 is centrally located in the copying machine. The photoconductive drum 12 is surrounded by a main corona generating device 13, an eraser 14, a developing unit 15, a corona generating device 16 for image transfer, a corona generating device 17 for sheet separation, a cleaning unit 18 and a discharging lamp unit 19, in that order. Therein, a sheet stored in a paper cassette 20 attached on the side of the copying machine is transported through a paper transport system 21 and a pair of resist rollers 22 to the image forming part consisting of the photoconductive drum 12, etc. After transfer of a developed image to the sheet, the sheet is transported by a transportation mechanism 23 to a fixing unit 24, and then discharged by a pair of discharging rollers 25 onto a copy tray 26.

Figure 2:
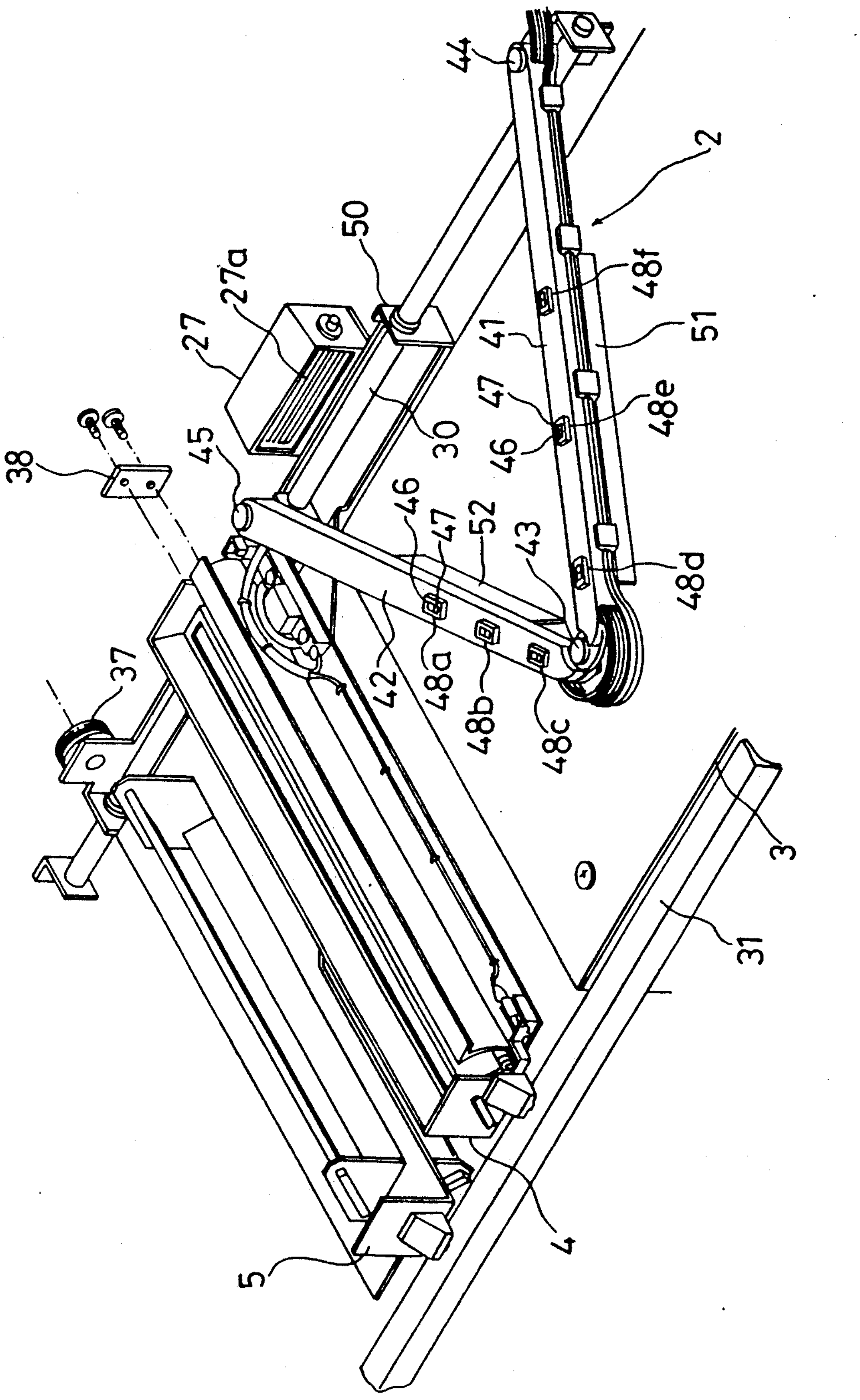
FIG. 2 is an isometric view of the scanning apparatus in part.

Now, the original detecting device 2 and the part of the optical system 3 to which the original detecting device is connected will be described with reference to FIG. 2, in which the background/rightward side is referred to as the rear and the foreground/leftward side is referred to as the front.

A guide rod 30 extends transversely in the rear, and the rear ends of the frames 4 and 5 are slidably fitted onto the guide rod 30. A guide rail 31 as a counterpart of the guide rod 30 extends in parallel across the front with the guide rod 30, and the front ends of the frames 4 and 5 are supported by the guide rail 31. A wire-type drive mechanism (not shown) is provided behind the movable frames 4 and 5, and it is connected to the first movable frame 4 by an attaching member 38 and linked with the second movable frame 5 by a driven pulley 37 which is rotatably mounted on the movable frame 5. Thereby, the pair of movable frames 4 and 5 are driven reciprocally along the guide rod 30 and guide rail 31.

Figure 3:
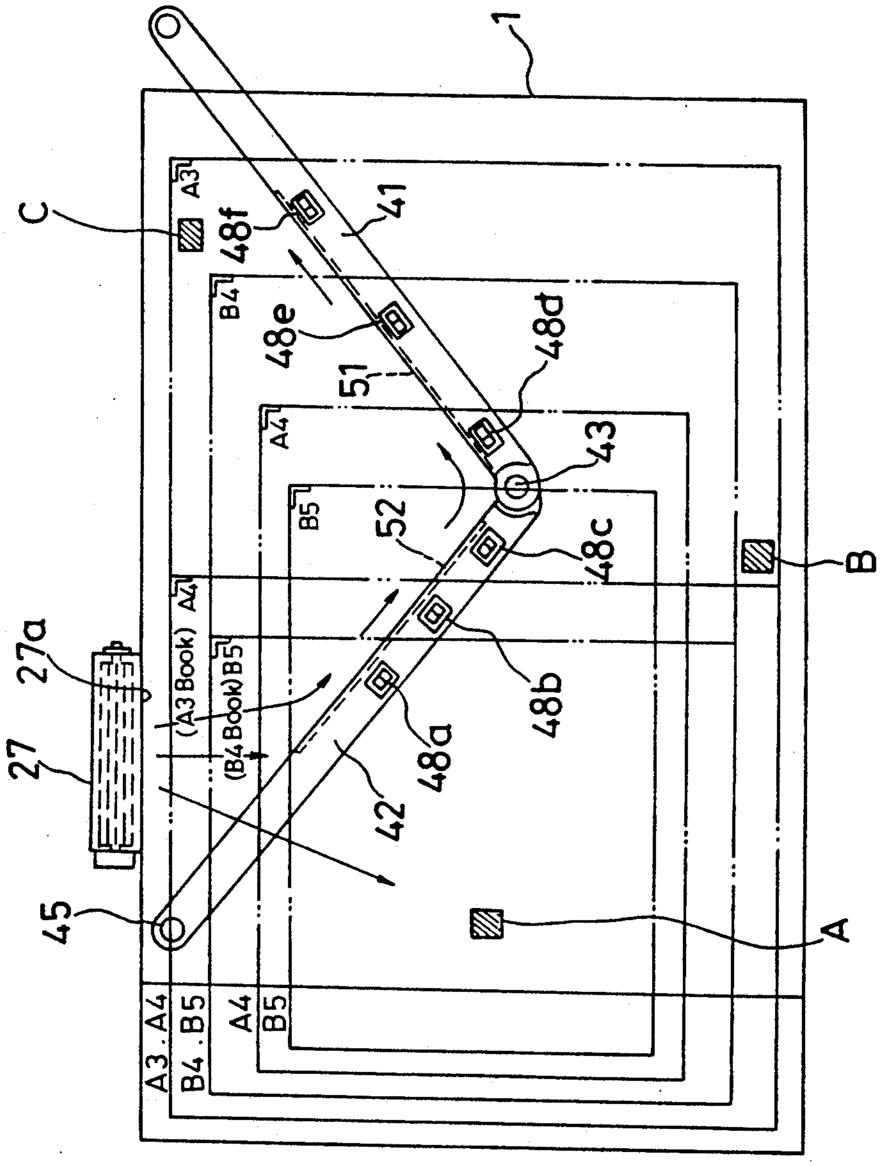
FIG. 3 is a schematic plan view of the scanning apparatus in part.

The original detecting device 2 comprises the pair of bars 41 and 42, formed of square tubing and pivotally joined by the pin 43. The non-joint end of the bar 41 is turnably connected to the copying machine body through a pin 44, and the non-joint end of the bar 42 is turnably connected with the rear end of the first movable frame 4 by a pin 45. Disposed in given locations on the upper surface of the bars 41 and 42 are original-size detecting photosensors 48*a* to 48*f*, each of which includes a light emitter 46 and a light receptor 47. Referring to FIG. 3, the optical sensors 48*a* to 48*f* are shown to be disposed in correspondence with the standard positions of several formal original sheet sizes as placed on the contact plate 1. Specifically, the optical sensor 48*a* corresponds to size B5 widthwise, the optical sensor 48*b* to size A4 widthwise, the optical sensor 48*c* to size B5 lengthwise, the optical sensor 48*d* to size A4 lengthwise, the optical sensor 48*e* to size B4, and the optical sensor 48*f* to size A3, respectively.

Referring back to FIG. 2, the pair of airstream guides 51 and 52 extend downward from the bars 41 and 42. In order to minimize the load on the pivotal bars 41 and 42, the guides 51 and 52 are made of a light-weight resin such as fluorocarbon polymer resin ("Teflon"). The guides 51 and 52 extend along the bars 41 and 42 and are of length in the range from one half to two thirds that of the bars 41 and 42, wherein they extend from the pin 43 through the midsection of the respective bars 41 and 42. The vertical length of the guides 51 and 52 is defined so that there exists a narrow vertical gap between them and the optical system 3, such that the guides 51 and 52 do not interfare with the optical system 3.

The blower 27 is mounted on a bracket 50 which is connected to the first movable frame 4 along the rear, and it moves along the guide rod 30 together with the first movable frame 4. The blower 27 has a ventilators 27*a* which are directed toward the bar 42, whereby cooling air is supplied into the space below the contact plate 1 (FIG. 1).

Operation of the embodiment will now be described.

When an original sheet is placed on the contact plate 1 and a sheet cover (not shown) is closed over it, the optical sensors 48*a* to 48*f* measure the sheet size. Therein, light is emitted from the light emitters 46 and the light receptors 47 receive reflected light and output sheet size signals. A controller (not shown) of the copying machine receives the signals and determines the size of the original on the plate 1 accordingly.

As the copying operation starts, the blower 27 is activated, and the movable frames 4 and 5 reciprocate to scan the original on the plate 1. In correspondence with the sliding movement of the frame 4, the bars 41 and 42 bend in a vee.

During the scanning operation, cooling air blown by the blower 27 flows as indicated by arrows in FIG. 3. The cooling air flows under the contact plate 1 and cools it. A portion of the cooling air flow strikes first the guide 52, and is deflected along the guide 51, thus being redirected. As a result, a sufficient amount of cooling air is supplied to the right-side portion of the contact plate 1, i.e., that region of the contact plate 1 as apart from the area corresponding to the standard sheet sizes. Meanwhile, that portion of the cooling air which does not strike the guides 52 and 51 is supplied to the remaining region under the contact plate 1, that is, the area corresponding to the sheet-size locations. Thereby, the most frequently scanned and strongly heated portion of the contact plate 1 is at the same time also cooled sufficiently by the cooling air. These two modes of cooling the contact plate 1 effectively and efficiently lower the temperature of the entire contact plate 1, even if the blower 27 is of lesser size.

Experiments in which the operational temperature of the lower surface of the contact plate 1 was recorded were carried out, and the results are shown in Table 1. Measuring points are indicated by letters A to C in FIG. 3.

TABLE 1

| Point | Without Guides (°C.) | With Guides (°C.) |
|---|---|---|
| A | 31.4 | 32.3 |
| B | 31.0 | 33.8 |
| C | 54.0 | 50.0 |

As shown in Table 1, the temperature of the contact plate 1 at measuring point C, which would otherwise be at the highest temperature, was lowered by the presence of the guides, although the temperatures at measuring points A and B increased. It should be appreciated from the experiments that since the guides 51 and 52 effect reduction of the highest temperature of the contact plate 1, they accordingly bring about improvement in overall temperature stability on the contact plate 1.

In conclusion, the guides 51 and 52 provided on the bars 41 and 42 redirect cooling air flow, such that the foregoing invention lowers the highest temperature of the contact plate 1, despite smaller blower size. Accordingly, the copying machine is suitable for successive high-speed copying operations without requiring that the blower 27 be replaced with a larger blower.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. An apparatus for planar scanning of an image contained in an original material, comprising:

a transparent plate for retaining an original source;

an optical system disposed in a position beneath said plate, for scanning said original material retained on said plate;

a size-detection arm disposed under said plate, having sensors for measuring a size of said original material retained on said plate;

means for blowing cooling air into a space below said plate; and means for flow-directional guiding of said cooling air, provided on said size-detection arm.

2. An apparatus according to claim 1, wherein said plate includes given locations into which standard-sized original material are positioned, and said blowing means is directed toward said given locations.

3. An apparatus according to claim 2, wherein said guiding means redirects a portion of said cooling air from said blowing means in a direction different from the direction toward said standard-sized original positioning locations.

4. An apparatus according to claim 1, wherein said size-detection arm comprises a pair of pivotally joined bars; and said sensors are provided on said bars.

5. An apparatus according to claim 4, wherein said blowing means is a fan directed toward said bars and located in a position transversely posterior to said optical system.

6. An apparatus according to claim 4, wherein said optical system includes a light source, and a transversely movable frame to which said light source is attached; and an end of said size-detection arm is connected with said frame.

7. An apparatus according to claim 4, wherein said sensors are disposed so as to correspond with said standard-sized original positioning locations.

8. An apparatus according to claim 1, wherein said guiding means is resin-composed.

9. An apparatus according to claim 8, wherein said guiding means is composed of fluorocarbon polymer.

10. An apparatus according to claim 1, wherein said size-detection arm is disposed between said optical system and said plate.

11. An apparatus according to claim 10, wherein said guiding means extends downward from said bars.

12. An apparatus according to claim 11, wherein said guiding means extends along said bars.

13. An apparatus according to claim 12, wherein the downward extension of said guiding means is limited such that between said guiding means and said optical system there is provided a gap, in order that action of the guiding means does not interfere with said optical system.

14. An apparatus according to claim 13, wherein said guiding means is resin-composed.

15. An apparatus according to claim 14, wherein said guiding means is composed of fluorocarbon polymer.

16. An apparatus according to claim 1, wherein said optical system includes a light source, and a transversely movable frame to which said light source is attached; and an end of said size-detection arm is connected with said frame.

17. An apparatus according to claim 16, wherein said blowing means is a fan directed toward said bars and located in a position transversely posterior to said optical system.

18. An apparatus according to claim 17, wherein said fan moves together with said frame.

* * * * *